United States Patent
Mackay

Patent Number: 5,887,283
Date of Patent: Mar. 30, 1999

[54] HAND GARDEN TOOL

[76] Inventor: John R. Mackay, 27840 Peterstiener, Bonanza, Oreg. 97623

[21] Appl. No.: 15,205

[22] Filed: Jan. 29, 1998

[51] Int. Cl.$^6$ .............. A41D 19/00; A01B 1/06
[52] U.S. Cl. ............ 2/161.6; 2/160; 2/163; 172/370
[58] Field of Search ............ 2/159, 160, 161.6, 2/161.7, 163, 17; 172/370, 371, 378, 375

[56] References Cited

U.S. PATENT DOCUMENTS

| | | | |
|---|---|---|---|
| 2,954,832 | 10/1960 | Pirone | 172/370 |
| 3,593,803 | 7/1971 | Ibach | 172/370 |
| 4,203,495 | 5/1980 | Crownover | 172/370 |
| 4,474,246 | 10/1984 | Arroyo | 172/370 |
| 4,494,249 | 1/1985 | Hansson | 2/161 R |
| 4,867,246 | 9/1989 | Kiger | 172/370 |
| 5,014,792 | 5/1991 | Gierloff | 172/371 |

*Primary Examiner*—Michael A. Neas
*Assistant Examiner*—Tejash D Patel

[57] ABSTRACT

A hand worn garden tool is provided including a glove having a plurality of fingers. Next provided is a plurality of finger gardening claws each mounted to an associated one of the fingers. Each finger gardening claw has at least one hinged section mounted to the glove for pivoting with a joint of a user.

5 Claims, 1 Drawing Sheet

HAND GARDEN TOOL

BACKGROUND OF THE INVENTION

1. Field of the Invention

The present invention relates to removable finger claws and more particularly pertains to a new hand garden tool for gardening purposes.

2. Description of the Prior Art

The use of removable finger claws is known in the prior art. More specifically, removable finger claws heretofore devised and utilized are known to consist basically of familiar, expected and obvious structural configurations, notwithstanding the myriad of designs encompassed by the crowded prior art which have been developed for the fulfillment of countless objectives and requirements.

Known prior art removable finger claws include U.S. Pat. No. 4,149,601; U.S. Pat. No. 4,474,246; U.S. Pat. No. 4,203,495; U.S. Pat. No. 5,014,792; U.S. Pat. No. 4,867,246; and U.S. Pat. Des. 351,933.

In these respects, the hand garden tool according to the present invention substantially departs from the conventional concepts and designs of the prior art, and in so doing provides an apparatus primarily developed for the purpose of gardening.

SUMMARY OF THE INVENTION

In view of the foregoing disadvantages inherent in the known types of removable finger claws now present in the prior art, the present invention provides a new hand garden tool construction wherein the same can be utilized for gardening purposes.

The general purpose of the present invention, which will be described subsequently in greater detail, is to provide a new hand garden tool apparatus and method which has many of the advantages of the removable finger claws mentioned heretofore and many novel features that result in a new hand garden tool which is not anticipated, rendered obvious, suggested, or even implied by any of the prior art removable finger claws, either alone or in any combination thereof.

To attain this, the present invention generally comprises a glove having a plurality of closed fingers and a closed thumb. Each finger and thumb has a front and a back. The glove is preferably constructed from a flexible material. Further, the glove defines a rear opening with a generally oval configuration for removably receiving a hand of a user. A plurality of finger claws are provided each having a rectangular cross-section along an entire length thereof. As shown in FIG. 1, each finger claw includes an inboard portion having a pair of laterally extending recessed portions formed on a bottom face thereof. Note FIG. 2. As such, a plurality of equally sized sections are defined which are pivotable within a common plane. Each section has a top face coupled to the front of an associated one of the fingers of the glove. Each finger claw further includes a rigid intermediate portion with a length which is at least three times that of each section of the inboard portion. An inboard end of the intermediate portion is coupled to the front of an associated one of the fingers of the glove. Also, each finger claw has an outboard extent perpendicularly and fixedly coupled to an outboard end of intermediate extent. The outboard extent extends downwardly to define a ground engaging claw.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hand garden tool apparatus and method which has many of the advantages of the removable finger claws mentioned heretofore and many novel features that result in a new hand garden tool which is not anticipated, rendered obvious, suggested, or even implied by any of the prior art removable finger claws, either alone or in any combination thereof.

It is another object of the present invention to provide a new hand garden tool which may be easily and efficiently manufactured and marketed.

It is a further object of the present invention to provide a new hand garden tool which is of a durable and reliable construction.

An even further object of the present invention is to provide a new hand garden tool which is susceptible of a low cost of manufacture with regard to both materials and labor, and which accordingly is then susceptible of low prices of sale to the consuming public, thereby making such hand garden tool economically available to the buying public.

Still yet another object of the present invention is to provide a new hand garden tool which provides in the apparatuses and methods of the prior art some of the advantages thereof, while simultaneously overcoming some of the disadvantages normally associated therewith.

Still another object of the present invention is to provide a new hand garden tool for gardening purposes.

Even still another object of the present invention is to provide a new hand garden tool that includes a glove having a plurality of fingers. Next provided is a plurality of finger gardening claws each mounted to an associated one of the fingers. Each finger gardening claw has at least one hinged section mounted to the glove for pivoting with a joint of a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
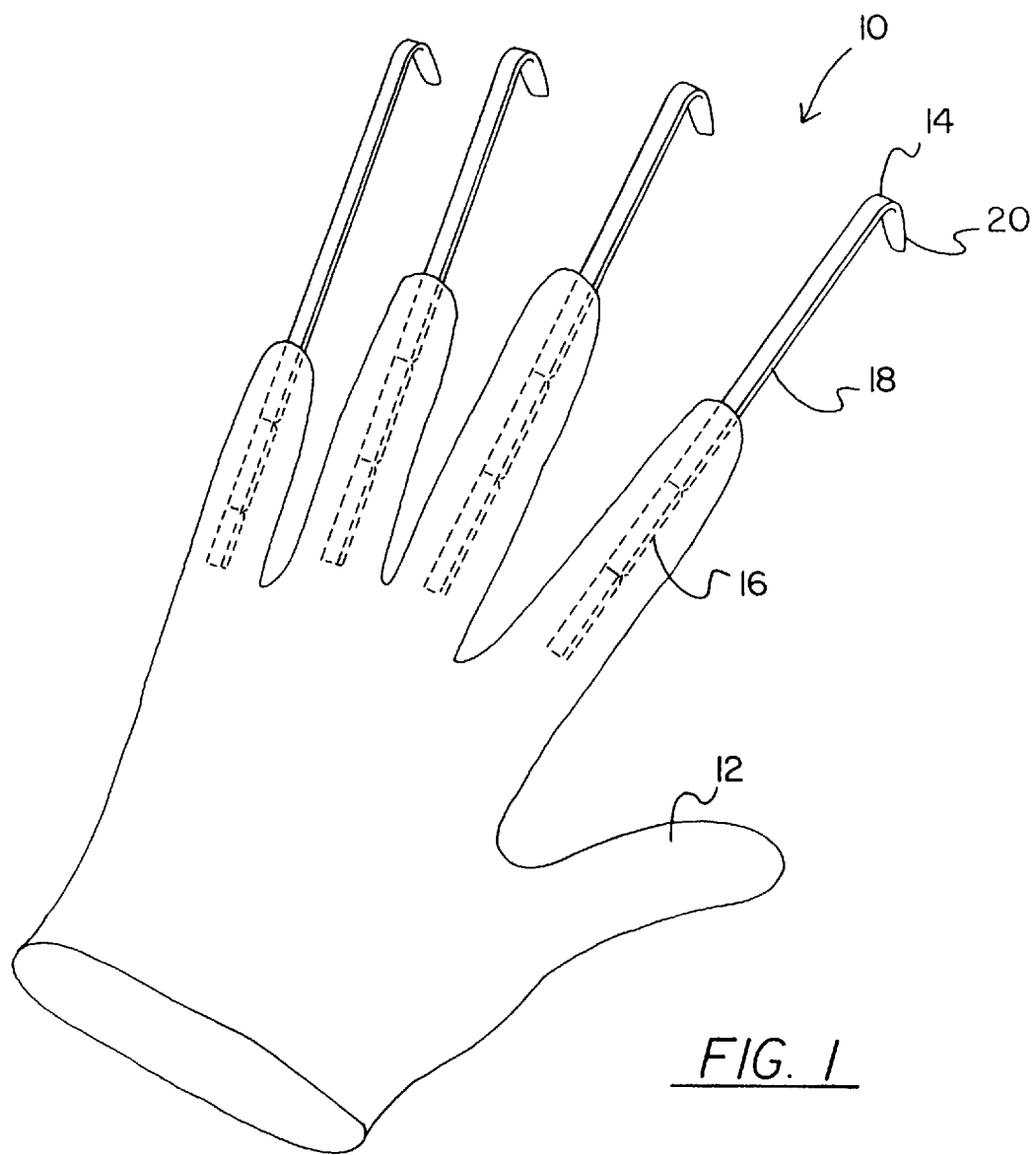
FIG. 1 is a top perspective view of a new hand garden tool according to the present invention.
Figure 2:
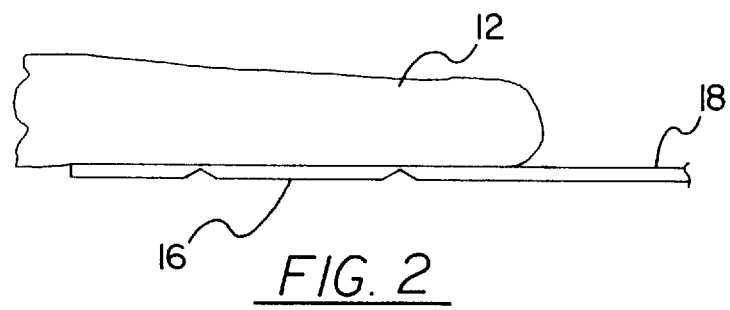
FIG. 2 is a side view of the present invention.

With reference now to the drawings, and in particular to FIGS. 1 through 2 thereof, a new hand garden tool embodying the principles and concepts of the present invention and generally designated by the reference numeral 10 will be described.

The present invention, designated as numeral 10, includes a cloth or leather glove 12 having a plurality of closed fingers and a closed thumb. Each finger and thumb has a front and a back. The glove is preferably constructed from a flexible material. Further, the glove defines a rear opening with a generally oval configuration for removably receiving a hand of a user.

A plurality of plastic resilient finger claws 14 are provided each having a constant rectangular cross-section along an entire length thereof. A width of each finger claw is preferably about ⅓ that of the associated finger. As shown in FIG. 1, each finger claw includes an inboard portion 16 having a pair of laterally extending recessed portions formed on a bottom face thereof. Note FIG. 2. Each recess has a triangular cross-section. As such, a plurality of equally sized sections are defined which are pivotable within a common plane. Each section has a top face coupled to the front of an associated one of the fingers of the glove. It should be noted that by attaching such plurality of sections to an entire length of each finger, as shown in FIG. 1, a robust coupling is afforded with the glove.

Each finger claw further includes a intermediate portion 18 with a length which is at least three times that of each section of the inboard portion. The intermediate portion further extends from the associated finger a length equal to the aforementioned finger. An inboard end of the intermediate portion is coupled to the front of an associated one of the fingers of the glove.

Also, each finger claw has an outboard extent 20 perpendicularly and fixedly coupled to an outboard end of intermediate extent. The outboard extent extends downwardly to define a ground engaging claw. In the preferred embodiment, the outboard extent defines an acute angle with the intermediate extent such that an outboard end thereof defines an edge which faces slightly rearward. As shown in FIG. 1, each outboard extent has a length equal to less than ¼ the intermediate extent.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hand worn garden tool comprising, in combination:

a glove including a plurality of closed fingers and a closed thumb each having a front and a back, the glove being constructed from a flexible material, wherein the glove defines a rear opening with a generally oval configuration for removably receiving a hand of a user;

a plurality of finger claws each having a rectangular cross-section along an entire length thereof, each finger claw including an inboard portion having a pair of laterally extending recessed portions formed on a bottom face thereof for defining a plurality of equally sized sections and further allowing the pivoting of each section within a common plane, each section having a top face coupled to the front of an associated one of the fingers of the glove, each finger claw further including a rigid intermediate portion with a length which is at least three times that of each section of the inboard portion, wherein an inboard end of the intermediate portion is coupled to the front of an associated one of the fingers of the glove, each finger claw also having an outboard extent perpendicularly and fixedly coupled to an outboard end of intermediate portion and extending downwardly therefrom.

2. A hand worn garden tool comprising:

a glove having a plurality of fingers; and a plurality of gardening claws mounted to the fingers, each gardening claw having hinged sections with recessed hinges mounted to the glove for pivoting with a joint of a user;

wherein an outboard section of each gardening claw extends from the glove and has a length at least three times that of the remaining sections of the associated gardening claw.

3. A hand worn garden tool as set forth in claim 2 wherein each gardening claw has a perpendicular portion.

4. A hand worn garden tool as set forth in claim 2 wherein each gardening claw has a constant cross-section along an entire length thereof.

5. A hand worn garden tool as set forth in claim 2 wherein a length of a portion of each gardening claw extending from the corresponding finger is at least a length of the corresponding finger of the glove.

* * * * *